J. E. MURRAY.
TANK SIPHON FOR LOCOMOTIVES.
APPLICATION FILED SEPT. 3, 1912.
1,060,616.
Patented May 6, 1913.
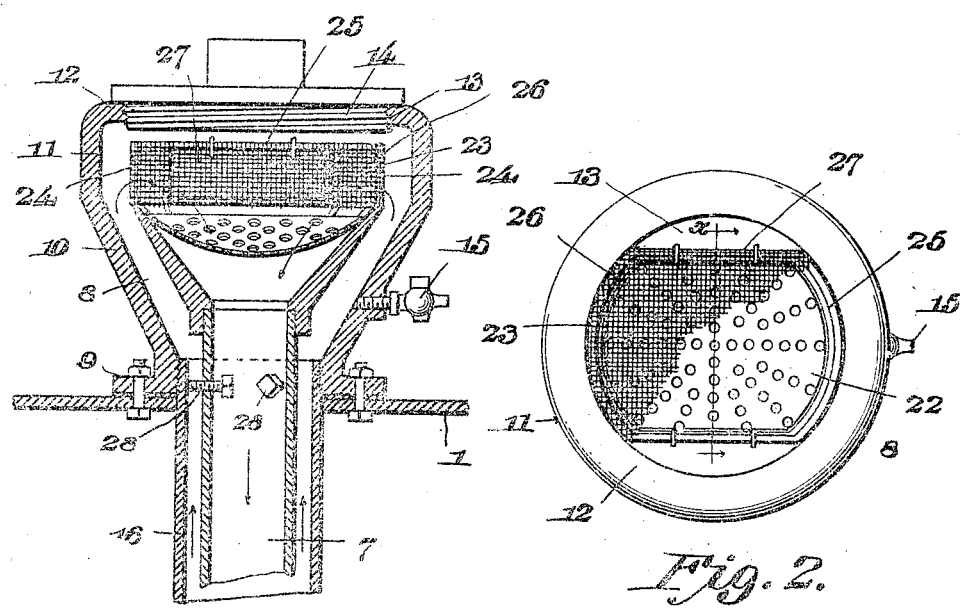
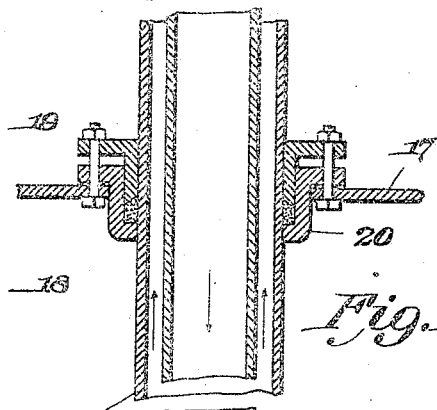
*Fig. 1.*
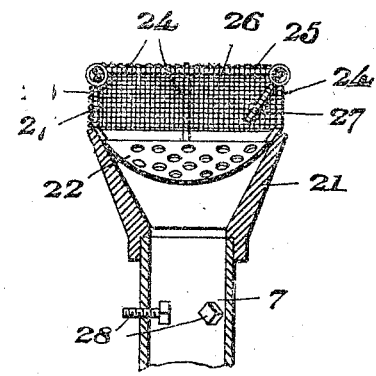
*Fig. 3.*
Witnesses
Inventor
James E. Murray.
By Joshua R. H. Potts.
Attorney

UNITED STATES PATENT OFFICE.

JAMES E. MURRAY, OF ALBUQUERQUE, NEW MEXICO.

TANK-SIPHON FOR LOCOMOTIVES.

1,060,616.      Specification of Letters Patent.    Patented May 6, 1913.

Application filed September 3, 1912. Serial No. 718,261.

*To all whom it may concern:*

Be it known that I, JAMES E. MURRAY, a citizen of the United States, residing at Albuquerque, county of Bernalillo, and State of New Mexico, have invented certain new and useful Improvements in Tank-Siphons for Locomotives, of which the following is a specification.

My invention relates to tank siphons for locomotives; and the object of my invention is to provide an improved siphon of the class mentioned equipped with means for cleaning the feed water as it passes from the tank to the injector. In most devices of this character as heretofore provided, the filter or cleaning device is so arranged that it is inaccessible for cleaning while the locomotive is in action or while the tank contains much water; and in those wherein the filter may be cleaned while the locomotive is running or while the tank is filled, the larger portions or particles of foreign matter are thrown back into the tank whence they again pass to and clog the filter or the siphon.

A further and particular object of my invention is to provide a device of the class mentioned which shall remove suspended matter from the feed water as it passes to the injector and prevent the larger particles from returning to the tank, and of such construction that the filtering device shall be accessible at all times for cleaning and removing the accumulated matter.

Other objects will appear hereinafter.

With these objects in view my invention consists in arranging the siphon with its upper end projecting through and above the top of the tank, forming the siphon with a strainer box at its upper end provided with a removable closure and arranging a strainer within the strainer box, the strainer being constructed to receive and hold the matter separated from the water.

My invention further consists in a device as mentioned in which the strainer may be readily removed.

My invention further consists in providing the bottom of the tank with a depression or well and extending the mouth of the siphon into the well in order that all of the water in the tank may be withdrawn through the siphon.

My invention further consists in various details of construction and arrangements of parts all as will be fully described hereinafter and particularly pointed out in the claims.

My invention will be more readily understood by reference to the accompanying drawings forming a part of this specification and in which—

Figure 1 is a vertical section of a device embodying my invention, Fig. 2 is a plan view of the same with the closure of the strainer box removed and a portion of the top wall of the strainer broken away, and Fig. 3 is a vertical section through the strainer taken on the line $x-x$ of Fig. 2.

Referring now to the drawings 1 and 2 indicate the plates forming the top and bottom walls respectively of the water tank of a locomotive. The bottom 2 is preferably provided with an aperture 3, and secured to said bottom beneath said aperture is a concave member 4 forming a well 5. Secured to the member 4 is a pipe connection or goose neck 6 leading to the injector. Threaded into the upper end of the connection 6 is a vertically disposed pipe 7 which extends upwardly above the top plate 1.

Arranged above and secured to the top plate 1 is a strainer box 8. This comprises a flange base 9, an upwardly flared conical body portion 10 preferably terminating in a cylindrical upper portion 11, and a top 12, the latter being provided with an enlarged aperture 13 into which is threaded a cap or closure 14.

15 indicates a vent arranged in the side of the box 8.

Threaded into the lower end or base of the strainer box 8 is a depending pipe 16 which extends downwardly into the well 5 and contains or surrounds the pipe 7. In the event that a horizontal partition 17 is provided in the tender dividing a lower water tank 18 from the upper air space 19, a stuffing box 20 is provided on the partition 17 surrounding the pipe 16 to prevent the water from the tank entering the space 19.

Arranged upon the upper end of the pipe 7 and within the box 8 is the strainer. This comprises an upwardly flared body portion 21, a foraminated plate 22 arranged therein, and a cage 23 projecting above the upper edge thereof. The plate 22 is concave and is preferably formed of perforated sheet metal. The cage 23 is formed with a frame comprising a plurality of vertical members 24, the lower ends of which are secured to the body member 21, and a ring 25 secured to the upper ends of the members 24. The sides and top of the frame thus formed are covered with wire mesh 26 and inwardly swinging doors 27 are provided upon opposite sides between adjacent members 24. The cage is preferably formed with flat parallel sides as shown in Fig. 2 and the doors 27 are preferably arranged upon the flat sides. The doors 27 admit refuse or large particles of foreign matter drawn up through the pipe 16 and prevent the same from returning to the tank. Should sufficient matter accumulate in the cage to prevent free operation of the siphon the strainer may be readily lifted from the box 8, after the closure 14 is removed, and quickly cleaned and replaced. It is obvious that on account of the arrangement of the box 8, the cleaning may be accomplished at any time, irrespective of the depth of water in the tank and whether the locomotive is running or not.

To prevent vibration of the pipes 7 and 16, set screws 28 and 29 are provided. The screws 28 are threaded through the pipe 7 adjacent the upper end and impinge against the pipe 16, and the screws 29 are threaded through the pipes 16 adjacent the lower end and impinged against the pipe 7.

Having described my invention what I claim as new and desire to secure by Letters Patent is:—

1. A tank, in combination with a siphon, the upper end of said siphon projecting above said tank and enlarged to form a strainer box, said strainer box being provided with an opening, a closure for said opening, and means in said strainer box for filtering the water and entrapping the matter filtered therefrom.

2. A locomotive water tank in combination with a siphon comprising a strainer box fixed to and projecting above the top of said tank, a pipe depending from said box, a pipe connection at the bottom of said tank, a vertically disposed pipe fixed to said connection and extending upwardly through the first said pipe into said box, and means on the upper end of said last mentioned pipe and within said box for filtering the water and entrapping the matter filtered therefrom.

3. A locomotive water tank in combination with a siphon comprising a strainer box provided with an opening in its top, a closure for said opening accessible from the top of said tank, a pipe depending from said box, a pipe connection at the bottom of said tank, a vertically disposed pipe fixed to said connection and extending upwardly to the first said pipe into said box, and means on the upper end of the last mentioned pipe and within said box for filtering the water.

4. A tank, in combination with a siphon and means in said siphon for filtering the water and entrapping the matter filtered therefrom, said means comprising a body portion, a screen in said body portion, a foraminated cage covering the upper end of said body portion and an inwardly swinging gate in said cage.

In testimony whereof I have signed my name to this specification in the presence of two subscribing witnesses.

JAMES E. MURRAY.

Witnesses:
WALSTIN POWELL,
JOHN G. GOULD.